United States Patent
Chibon et al.

(10) Patent No.: US 12,402,060 B2
(45) Date of Patent: Aug. 26, 2025

(54) SERVICE DOWNLOAD OPTIMIZATION FOR NANOTECH MESH

(71) Applicant: Red Hat, Inc., Raleigh, NC (US)

(72) Inventors: Pierre-Yves Chibon, Saint-Pol-de-Léon (FR); Leigh Griffin, Waterford City (IE)

(73) Assignee: Red Hat, Inc., Raleigh, NC (US)

( * ) Notice: Subject to any disclaimer, the term of this patent is extended or adjusted under 35 U.S.C. 154(b) by 518 days.

(21) Appl. No.: 17/669,105

(22) Filed: Feb. 10, 2022

(65) Prior Publication Data
US 2023/0254753 A1    Aug. 10, 2023

(51) Int. Cl.
*H04W 40/20* (2009.01)
*H04W 40/04* (2009.01)
*H04W 84/18* (2009.01)

(52) U.S. Cl.
CPC ........... *H04W 40/20* (2013.01); *H04W 40/04* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 7,539,488 B2 | 5/2009 | Friedman | |
| 8,005,879 B2 | 8/2011 | Bornhoevd et al. | |
| 9,081,643 B2 | 7/2015 | Wang et al. | |
| 10,303,456 B2 | 5/2019 | Hunt et al. | |
| 10,944,669 B1* | 3/2021 | Ramanathan | H04L 45/02 |
| 11,089,454 B2 | 8/2021 | Kumar et al. | |
| 2011/0116416 A1* | 5/2011 | Dobson | H04W 40/20 370/255 |
| 2014/0050216 A1* | 2/2014 | Benny | H04L 45/00 370/389 |
| 2015/0110108 A1* | 4/2015 | Jacob | H04L 69/22 370/392 |
| 2016/0309392 A1* | 10/2016 | Agardh | H04W 40/20 |
| 2017/0135033 A1* | 5/2017 | Vecera | H04W 72/542 |
| 2022/0322276 A1* | 10/2022 | Karlgaard | G01S 5/14 |
| 2023/0232282 A1* | 7/2023 | Belur Ramachandra | H04W 28/16 370/252 |

OTHER PUBLICATIONS

Brown, Stephen, and Cormac Sreenan. "A New Model for Updating Software in Wireless Sensor Networks." National University of Ireland Maynooth; University College Cork, 2006, 6 pages.
Toro-Betancur, Verónica, et al. "A Scalable Software Update Service for IOT Devices in Urban Scenarios." Aalto University, Finland, Oct. 22-25, 2019, 8 pages.

* cited by examiner

*Primary Examiner* — Srinivasa R Reddivalam
(74) *Attorney, Agent, or Firm* — Womble Bond Dickinson (US) LLP (57) ABSTRACT

A method includes determining characteristics of nodes of a mesh network and selecting one or more nodes of the mesh to receive a payload in view of the characteristics of the plurality of nodes of the mesh network. The method further includes pushing the payload to the one or more selected nodes of the mesh network, wherein the one or more nodes propagate the payload to remaining nodes of the mesh network.

20 Claims, 6 Drawing Sheets

SERVICE DOWNLOAD OPTIMIZATION FOR NANOTECH MESH

TECHNICAL FIELD

Aspects of the present disclosure relate to networked devices, and more particularly, to a download optimization service for mesh networks.

BACKGROUND

A mesh network is a network topology that includes nodes (i.e. bridges, switches, internet-of-things (IoT) devices, and other infrastructure devices) that are interconnected directly and non-hierarchically to other nodes and interact to communicate within the mesh. The interconnected format of the nodes allows for multiple nodes to participate in the relay of information.

Mesh networks may be formed from multiple types of devices, including nanotechnology, or nanotech, devices. Nanotech is an emerging technology that includes devices on a miniature scale, including atomic, molecular, and supramolecular scale. For example, nanotech devices may have dimensions less than 100 nanometers (nm). The reduced size of such devices allows for a wide range of potential applications, including biological applications. Large numbers of nanotech devices may be organized in a mesh network.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments without departing from the spirit and scope of the described embodiments.

DETAILED DESCRIPTION

Internet-of-things (IoT) devices have become increasingly ubiquitous and, as a result, various solutions have been proposed to communicate with and between large networks of IoT devices. IoT devices can have various types of software and/or hardware configurations and capabilities. By networking the IoT devices together, functionalities performed by one of the IoT devices may be provided as a service to other IoT devices that lack that functionality. For example, some IoT devices may have a particular type of processing functionality (such as authentication or password management) that may be provided to other IoT devices in the network.

In a conventional mesh networks, updating the nanotech or IoT devices of the mesh network is difficult and resource intensive. Each device on the network has to pull the data for the update, verify the integrity of the update, potentially de-compress the update and install the update. The full mesh network may include hundreds or thousands of devices which leads to significant duplication and wasted processing power. For example, the retrieval of the updates may utilize limited bandwidth of all nodes, the verification, de-compression, and installation of the update may utilize a significant amount of computing resources (e.g., memory, processing power, storage, etc.) or may require computing resources that are not available to each node device.

Aspects of the disclosure address the above-noted and other deficiencies by providing a download optimization service to determine and perform an optimized download for a mesh network at a given point in time. The download optimization service may receive information (e.g., an update, download, etc.) to be projected into the mesh network. Upon receiving the information, the download optimization service may retrieve real time information from each of the node devices in the mesh network. The real time information may include networking capabilities of the device, network utilization, and computing resource capabilities and utilization of the device. Additionally, the download optimization service may determine geographical neighbors of each device that the device can directly broadcast to (e.g., via peer to peer communication). The download optimization service may determine which of the node device of the mesh network having optimal network conditions, resource utilization, and geographical location within the mesh to push the update/download. Such target devices may receive the update along with a list of geographical neighbors to which the target device is to broadcast the update/download. For example, each device in the mesh may include a local download service agent to receive the update and propagate the update according to instructions received with the update from the download optimization service.

The local download service agent of each node device may download, and verity the integrity and authenticity of the update/download. The download service agent may also decompress the file prior to propagating to neighbor nodes. The download service agent receives the propagation instructions and a list of neighbor nodes. The download service agent may then perform a broadcast to a subset of the neighbor mesh at periodic intervals to reduce the outbound network strain on the broadcasting device. Furthermore, the download service agent may report to the download optimization service which devices received the update to allow for tracking, at a master level, of which devices of the mesh network have successfully received the update. The download optimization service may then coordinate the installation strategy of choice (e.g., simultaneous or staged installation).

As compared to conventional devices, embodiments of the present disclosure provide for smoother distribution of updates in a lightweight manner with the heavy lifting being performed by nodes that have the necessary capabilities to handle it. Embodiments also provide for additional control and adaptability for distribution of information through a mesh network.

Figure 1:
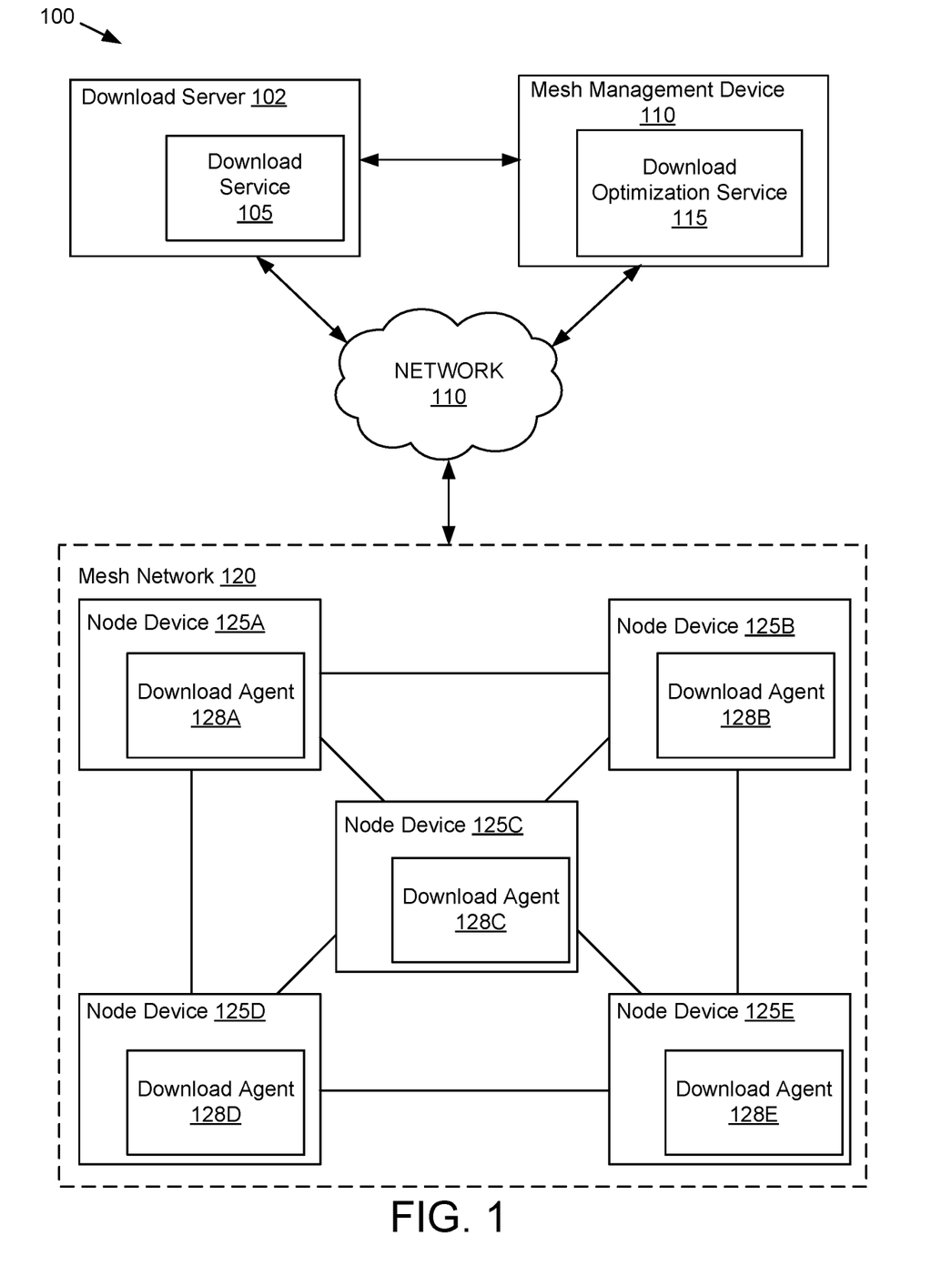
FIG. 1 is a block diagram that illustrates an example of a network architecture, in accordance with one or more aspects of the present disclosure.

FIG. 1 depicts a high-level component diagram of an illustrative example of a network architecture 100, in accordance with one or more aspects of the present disclosure. However, although the discussion with respect to FIG. 1 describes a mesh network, other network architectures (e.g., non-mesh) are possible without deviating from the scope of the present disclosure, and the implementation of a computer system utilizing examples of the disclosure are not necessarily limited to the specific architecture depicted by FIG. 1.

As depicted in FIG. 1, network architecture 100 includes a download server 102 and a mesh management device 100 coupled to a mesh network 120 via a network 110. The download server 102 includes a download service 105 for providing a download payload that is to be distributed to nodes of the mesh network. The mesh management device 110 includes a download optimization service 115. The mesh network 120 includes a plurality of node devices 125A-E. Although depicted as separate, the download server 102 and the download optimization service 115 may also be implemented as a node of the mesh network 120. Furthermore, although five node devices are depicted in FIG. 1, any number of node devices may be included in the mesh network 120. Network 110 may be a public network (e.g., the internet), a private network (e.g., a local area network (LAN) or wide area network (WAN)), or a combination thereof. In one embodiment, network 110 may include a wired or a wireless infrastructure, which may be provided by one or more wireless communications systems, such as a WiFi™ hotspot connected with the network 110 and/or a wireless carrier system that can be implemented using various data processing equipment, communication towers (e.g., cell towers), etc. The network 110 may carry communications (e.g., data, message, packets, frames, etc.) between the various components of the configuration device 140 and one or more of the node devices 125A-E.

The download server 102 and each node device 125A-E may include a processing device, memory, storage, networking hardware, and any other computing hardware. The processing device may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device may also include one or more special-purpose processing devices such as an application specific integrated circuit (ASIC), a field programmable gate array (FPGA), a digital signal processor (DSP), network processor, or the like. The memory may include volatile memory devices (e.g., random access memory (RAM)), non-volatile memory devices (e.g., flash memory) and/or other types of memory devices. Furthermore, each of the computing devices may be a server, a mainframe, a workstation, a personal computer (PC), a mobile phone, a palm-sized computing device, a virtual instance of a computing device, etc. In some examples, each of the node devices 125A-E may be an IoT device or nanotech device.

Networking hardware of the computing devices (e.g., node devices 125A-E, download server 102, mesh management device 110) may include a networking interface through which a computing device can communicate with one or more other network connected devices. In some embodiments, a network interface may include a wireless technology, such as WiFi™, Bluetooth, Home radio frequency (Home RF), radio frequency identifier (RFID), for example. In some examples, the node devices 125A-E of the mesh network may communicate via peer to peer network techniques The node devices 125A-E may perform one or more services within the mesh network 120. As used herein, a "service" provided by the node device refers to a task or other technical activity performed by the node device 125A-E on behalf of or for another node device. A service may include computer program logic utilized to provide the specified task or technical activity. Thus, a service can be implemented in hardware, firmware, and/or software. In one embodiment, services are stored on a non-transitory storage device (i.e., a computer program product), loaded into a memory, and executed by one or more processing devices. In some embodiments, the service may be provided by execution of computer instruction code on processing device. Examples of services include, but are not limited to, an authentication service, a storage service, a gateway service, a processing service, a power management service, and/or a packaging service.

In some examples, the mesh management device 110 may retrieve, or otherwise obtain, information about each of the nodes devices 125A-E of the mesh network 120. The information may include computing capabilities and networking capabilities of each node device 125A-E. The mesh management device 110 may further determine geographic locations of each node device 125A-E with respect to the other node devices of the mesh network 120.

Additionally, the node devices 125A-E may each include a download agent 128A-E to receive and/or propagate a payload from the download service 105. For example, the download agent 128A-E for each node device 125A-E may be configured to receive a payload (e.g., from the download optimization service 115) along with instructions for propagating the payload to additional nodes. For example, the instructions may include a list of neighbor nodes to which the payload should be provided. Neighbor nodes may be nodes that are only one network hop from the distributing node (e.g., with direct peer to peer communication). For example, the download optimization service 115 may determine that node device 125C is the optimal node for an initial seeding of a payload. The download optimization service 115 may provide the payload to node device 125C along with distribution instructions and a list of the neighbor nodes (e.g., node devices 125A, 125B, 125D, and 125E). The download agent 128C may then transmit the payload to the download agents of each of the neighbor nodes. In some examples, the node device 125C may report back to the download optimization service 115 which neighbor node devices successfully received the payload. In some examples, the instructions received by the download agent 128C may include authentication instructions, de-compression instructions, etc. depending on the optimal distribution plan determined by the download optimization service 115.

Figure 2:
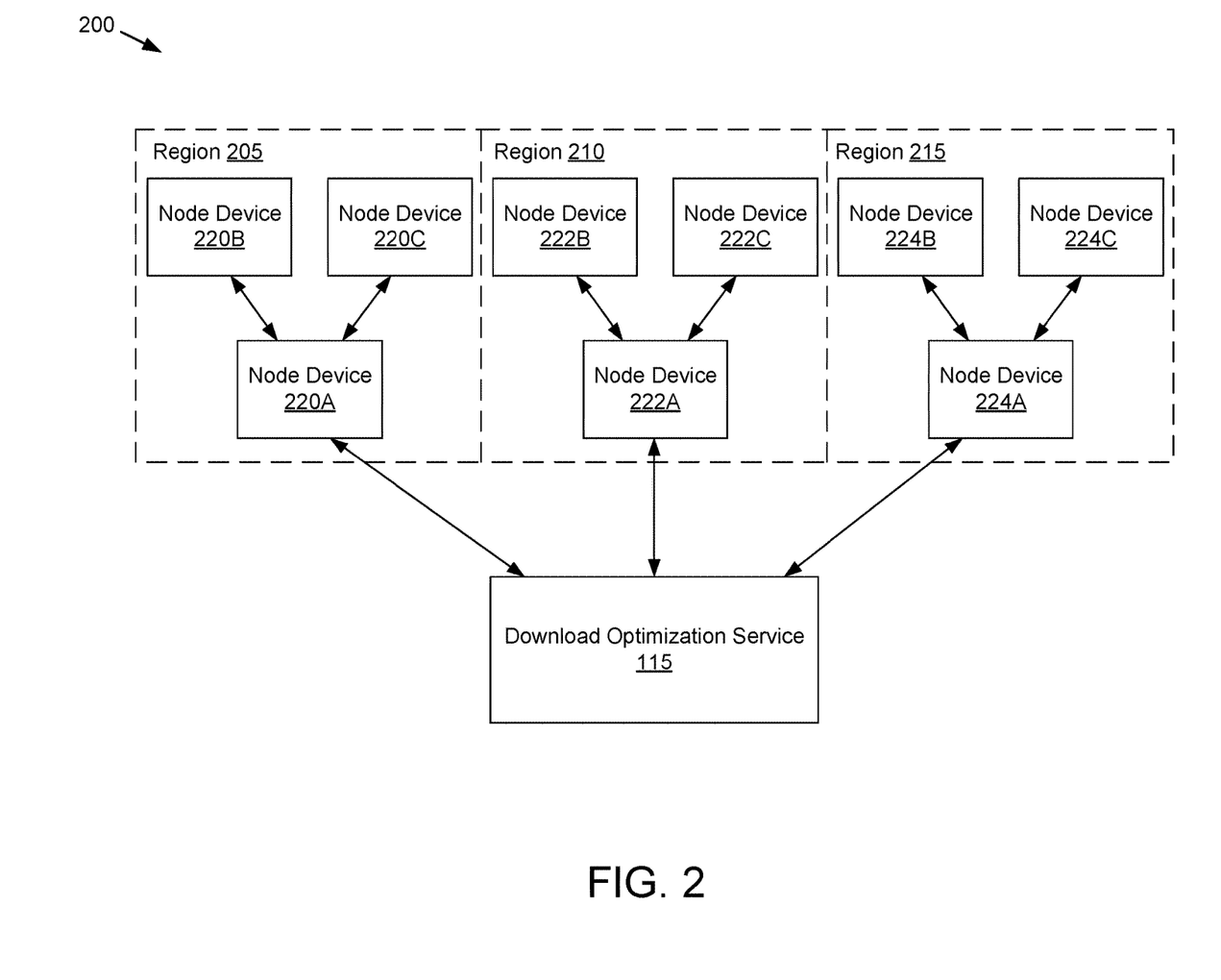
FIG. 2 is a system diagram illustrating an example mesh network, in accordance with one or more aspects of the present disclosure.

FIG. 2 is a system diagram illustrating an example mesh network 200, according to some embodiments. The mesh network 200 includes a download optimization service 115, which may be the same or similar to download optimization service 115 of FIG. 1. The mesh network 200 further includes geographic regions 205, 210, and 215 each including one or more node devices. For example, geographic region 205 may include node devices 220A-C, geographic region 210 may include node devices 222A-C, and geographic region 215 may include node devices 224A-C. Although for ease of illustration three regions are depicted, each including three node devices, embodiments may include any number of regions and each region may include any number of node devices.

As depicted, the download optimization service 115 may be in communication with one or more node devices within each region 205, 210, and 215. As described above with respect to FIG. 1, the download optimization service 115 may determine an optimal payload distribution plan based on information about each of the devices in the mesh network 200. For example, the download optimization service 115 may obtain computing capabilities for each of the node devices in the mesh network (e.g., including processing power, memory, storage, networking, etc.) as well as utilization information for the computing resources. Thus, the download optimization service 115 may have a full view of the mesh network with capabilities, statuses, services, importance, etc. for each node as well as neighboring nodes and relative geographic location. Using this information, the download information service 115 may identify which nodes of the mesh network to receive an initial seeding of the payload and from which the payload can be propagated to additional nodes in the mesh network. For example, the download optimization service 115 may identify nodes that are capable of receiving the payload, which are capable of transmitting the payload to neighboring nodes, and which would not negatively impact other important operations within the mesh network.

In some examples, as depicted in FIG. 2, the download optimization service 115 may push a payload to each of the selected node devices 220A, 222A, and 224A based on the determination of the optimal distribution plan determined above. The node devices 220A may receive the payload along with a list of neighboring nodes of node device 220A (e.g., node device 220B-C) to which the payload is to be propagated from node device 220A. Similarly, node device 222A may receive a list including node device 222B and 222C to which node device 222A is to transmit the payload. Furthermore, node device 224A may receive a neighboring nodes list and instructions to propagate the payload to node devices 224B-C. In some examples, the download optimization service 115 may include instructions to the node devices 220A, 222A, and 224A to authenticate and verify the payload prior to transmitting the payload to neighboring devices. In some examples, the download optimization service 115 may include instructions to the node devices 220A, 222A, and 224A to decompress the payload prior to transmitting the payload to neighboring devices (e.g., if neighboring nodes do not have the resources to decompress the payload). Thus, the node devices 220A, 222A, and 224A may act as seed nodes from which a payload can be processed and propagated to the remaining nodes in the mesh network 200.

Figure 3:
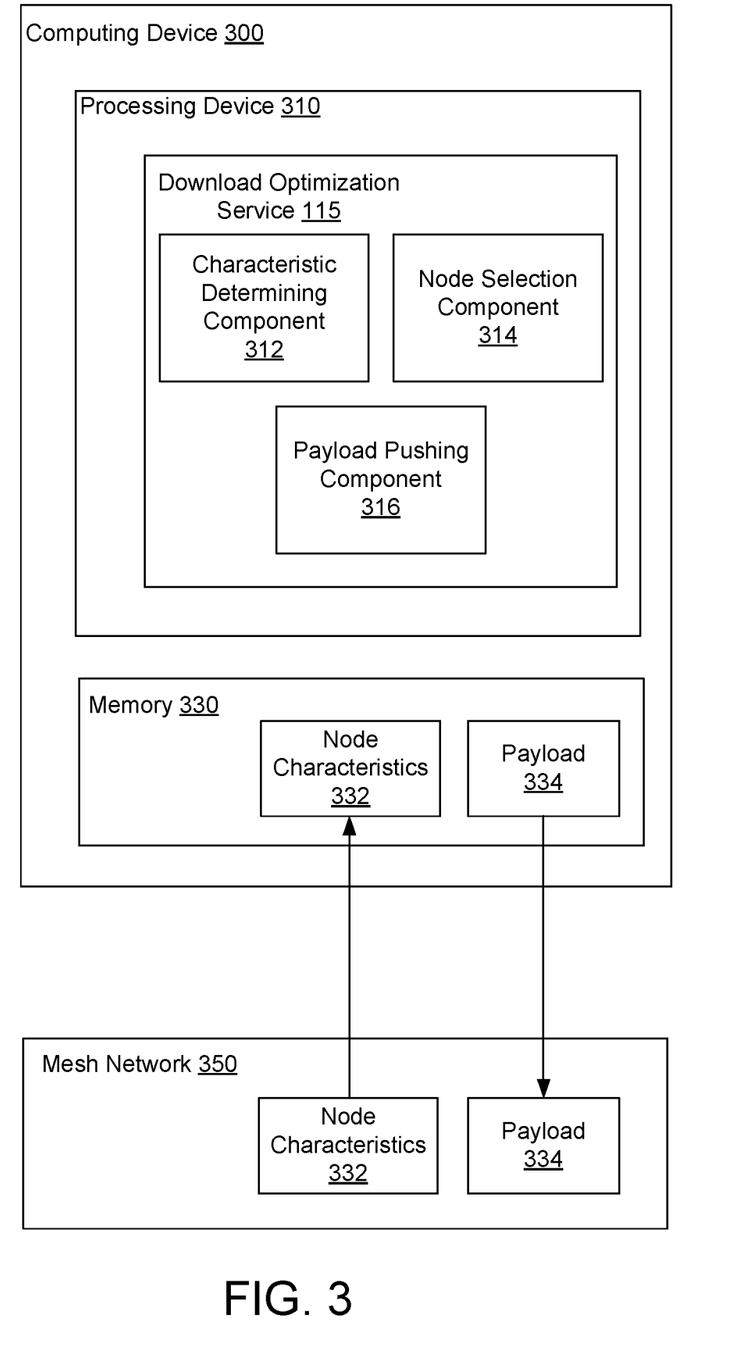
FIG. 3 depicts a component diagram that illustrates a computing system for download optimization in a mesh network, in accordance with one or more aspects of the present disclosure.

FIG. 3 is a block diagram that illustrates a computing system 300 for download optimization in a mesh network, according to some embodiments. Computing system 300 may include a processing device 310 and memory 330. Memory 330 may include volatile memory devices (e.g., random access memory (RAM)), non-volatile memory devices (e.g., flash memory) and/or other types of memory devices. Processing device 310 may be a central processing unit (CPU) or other processing device of computing system 300. Computing device 300 may be coupled to a mesh network 350. The mesh network 350 may include several computing nodes in communication with one another.

In one example, the processing device 310 may execute a download optimization service 115. The download optimization service 115 may include a characteristic determining component 312, a node selection component 314, and a payload pushing component. The characteristic determining component 312 may obtain node characteristics 332 from the mesh network 350 for each of the computing nodes of the mesh network 350. Node characteristics 332 may include available processing capabilities, memory, storage, communication and networking capabilities, and so forth. Additionally, node characteristics 332 may include the utilization of computing resources of the nodes (e.g., a current CPU, memory, and networking bandwidth being utilized at a given point in time). The node selection component 314 may select one or more nodes of the mesh network 350 to receive a payload 334 (e.g., a download, an update, software, firmware, etc.) and distribute the payload 334 to neighboring nodes in the mesh. The node selection component 314 may select the target nodes based on the node characteristics 332 determined by the characteristic determining component 312. The payload pushing component 316 may then provide the payload 334 to the one or more selected target nodes. In some examples, the node selection component 314 may also determine a list of neighbor nodes of the selected target nodes and provide the list along with instructions for how to distribute the payload 334 to each of the neighbor nodes in the list.

Figure 4:
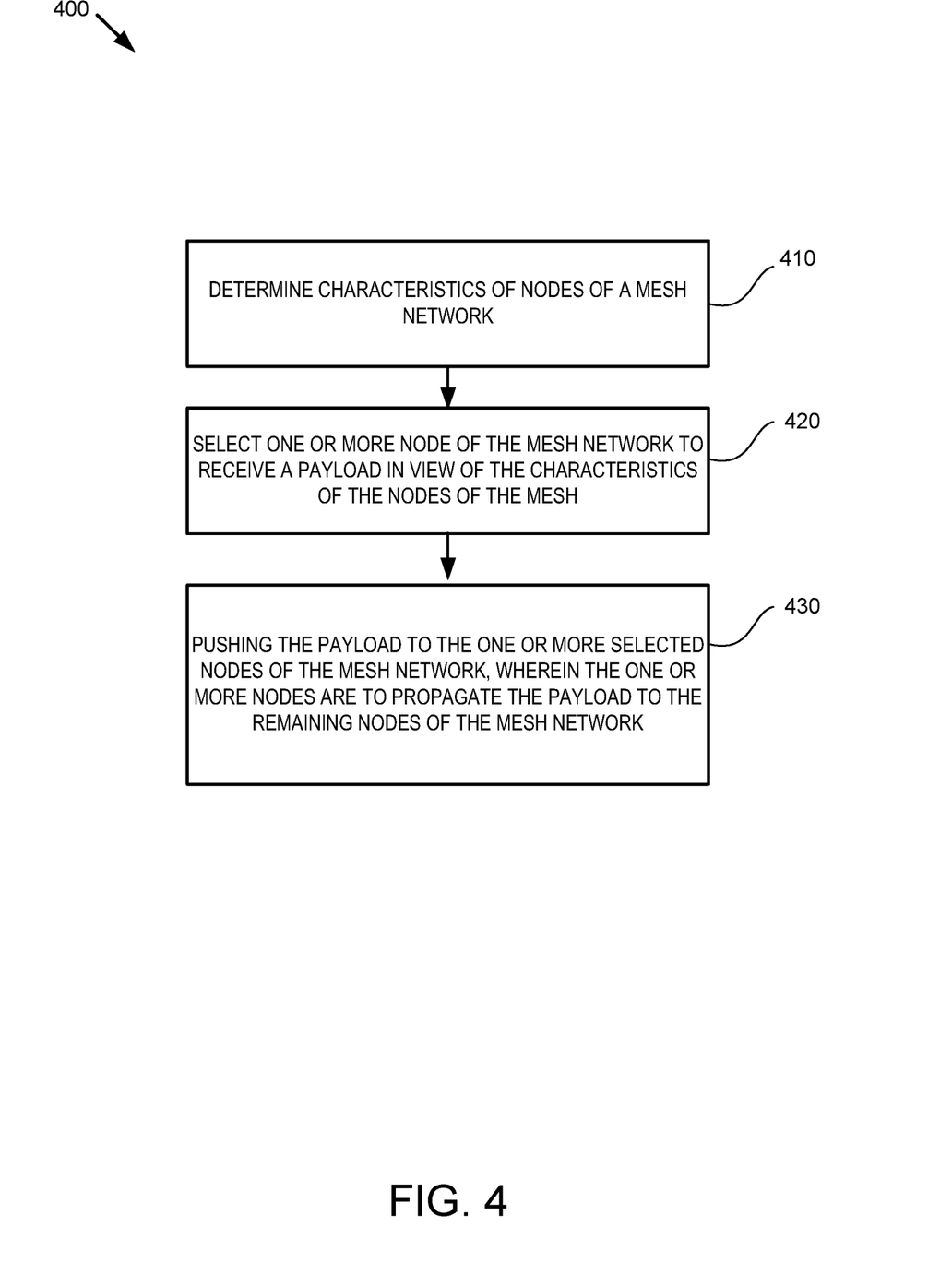
FIG. 4 is a flow diagram of a method of pushing a payload to nodes of a mesh network, in accordance with one or more aspects of the disclosure.

FIG. 4 is a flow diagram of a method 400 of pushing a payload to nodes of a mesh network, in accordance with one or more aspects of the disclosure. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 400 may be performed by download optimization service 115 of at least FIG. 1.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

Method 400 begins at block 410, where processing logic determines characteristics of nodes of a mesh network. The characteristics may include at least one of processing capacity, available memory, and available storage. The characteristics may also include networking capabilities of each of the plurality of nodes of the mesh network. In some examples, the characteristics may include a relative geographic location of each of the plurality of nodes of the mesh with respect to each of the other nodes of the mesh.

At block 420, the processing logic selects one or more nodes of the mesh network to receive a payload in view of the characteristics of the nodes of the mesh network. The processing logic may further select the one or more nodes in view of characteristics of respective neighboring nodes of each of the plurality of nodes of the mesh network. The characteristics of the respective neighboring nodes may include the networking capabilities of the neighboring nodes or a classification of the neighboring nodes. For example, the processing logic may select nodes of the mesh that are capable of receiving and performing operations on the payload, such as verification, decompression, etc. The processing logic may also select the nodes that have the capabilities to transmit the payload to additional nodes. In some examples, the processing logic selects the nodes that are in communication with a large enough number of neighbor nodes to provide for an efficient and/or optimized distribution (e.g., minimal number of hops to transfer the payload from the selected nodes to each of the remaining nodes). For example, the processing logic may attempt to select geographically diverse nodes that also are in communication with several neighbor nodes to push the payload to initially such that the payload can be distributed to each of the neighbor nodes in the mesh with only one hop.

At block 430, the processing logic pushes the payload to the one or more selected nodes of the mesh network, wherein the one or more nodes are to propagate the payload to the remaining nodes of the mesh network. The processing logic may also push, to the one or more selected nodes, instructions to propagate the payload to respective neighboring nodes of the one or more selected nodes. The instructions may include a list of neighbor nodes that the payload is to be propagated to from the selected node. The instructions may also include a method for propagating the payload, such as the communication channel to be used and the timing of transmitting the payload (e.g., all at once, periodically, etc.).

Figure 5:
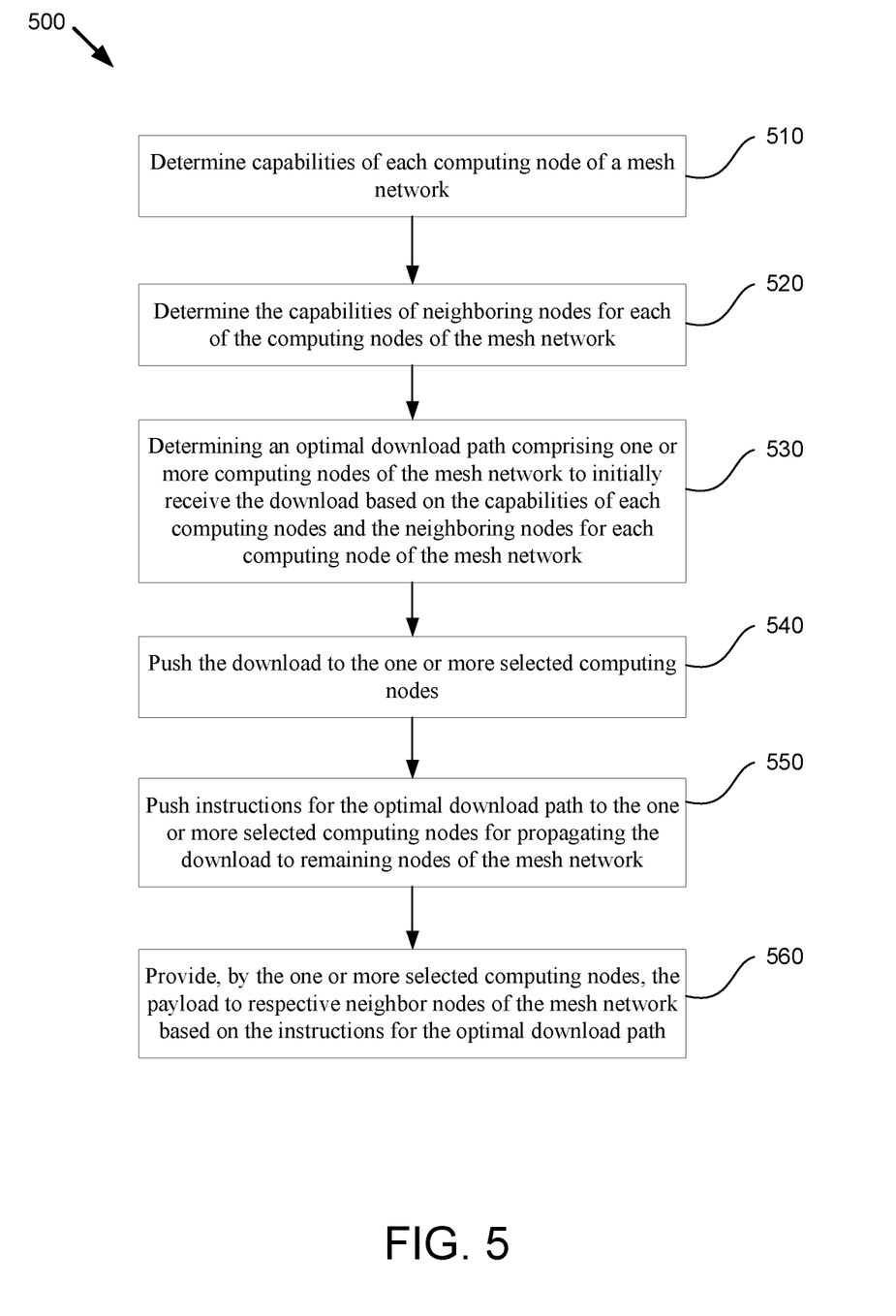
FIG. 5 is a flow diagram of a method of optimizing a software download into a mesh network, in accordance with one or more aspects of the disclosure.

FIG. 5 is a flow diagram of a method 500 of optimizing a software download into a mesh network, in accordance with one or more aspects of the disclosure. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 500 may be performed by download optimization service 115 of at least FIG. 1.

With reference to FIG. 5, method 500 illustrates example functions used by various embodiments. Although specific function blocks ("blocks") are disclosed in method 500, such blocks are examples. That is, embodiments are well suited to performing various other blocks or variations of the blocks recited in method 500. It is appreciated that the blocks in method 500 may be performed in an order different than presented, and that not all of the blocks in method 500 may be performed.

Method 500 begins at block 510, the processing logic determines capabilities of each computing node of a mesh network. For example, the processing logic determines the computing capabilities of each computing node of the mesh network, such as CPU capacity, an amount of RAM, an amount of physical storage, communication capabilities such as WiFi™, infrared (IR), RFID, or any other network or peer to peer communication protocols. For example, the processing logic may determine what hardware is included in each of the computing nodes. The processing logic may further determine the utilization of the hardware computing resources of each computing node. For example, the processing logic may continuously monitor, or intermittently determine, the utilization of the computing resources of each node in the network.

At block 520, the processing logic determines the capabilities of neighboring nodes for each of the computing nodes of the mesh network. The processing logic may determine which nodes neighbor each node in the mesh network both geographically and with respect to the capacity to directly communicate with one another. For example, the processing logic may determine a list of neighbor nodes for each node. The list of neighbor nodes may indicate the nearby neighbor nodes that a particular node can communicate with directly.

At block 530, the processing logic determines an optimal download path including one or more computing nodes of the mesh network to initially receive the download based on the capabilities of each computing node and the corresponding neighboring nodes for each computing node of the mesh network. The processing logic may determine the optimal download path based on which computing nodes have the capability to receive the download, perform one or more operations on the download, and propagate the download. For example, some nodes in the mesh network may not have enough memory or storage resources to receive the download and perform operations such as verification, decompression, etc. Therefore, the processing logic identifies computing nodes of the mesh that do have the requisite amount of available resources and bandwidth to receive the download, perform the operations, and then provide the downloads to the other nodes of the mesh. The optimal download path may further be determined based on node types, node services, and node criticality. For example, mission critical nodes, such as a life critical nanotech node used in the human body that cannot fail, may be avoided as the selected node to prevent overwhelming the resources of such a node and causing failures in the network.

At block 540, the processing logic pushes the download to the one or more selected computing nodes. At block 550, the processing logic pushes instructions for the optimal download path to the one or more selected computing nodes for propagating the download to remaining nodes of the mesh network. The instructions for the optimal download path may include the neighbor nodes to which the selected computing nodes are to provide the download. The instructions may include the communication method for providing the download to the neighbor nodes (e.g., IR, RFID, WiFi™, Ethernet, or the like) and the timing of distributing the download (e.g., in a rolling manner, all at once, intermittently, and so forth).

At block 560, the processing logic provides, by the one or more selected computing nodes, the download to respective neighbor nodes of the mesh network based on the instructions for the optimal download path. In some examples, the one or more selected computing nodes returns an indication of the computing nodes that successfully received the download.

Figure 6:
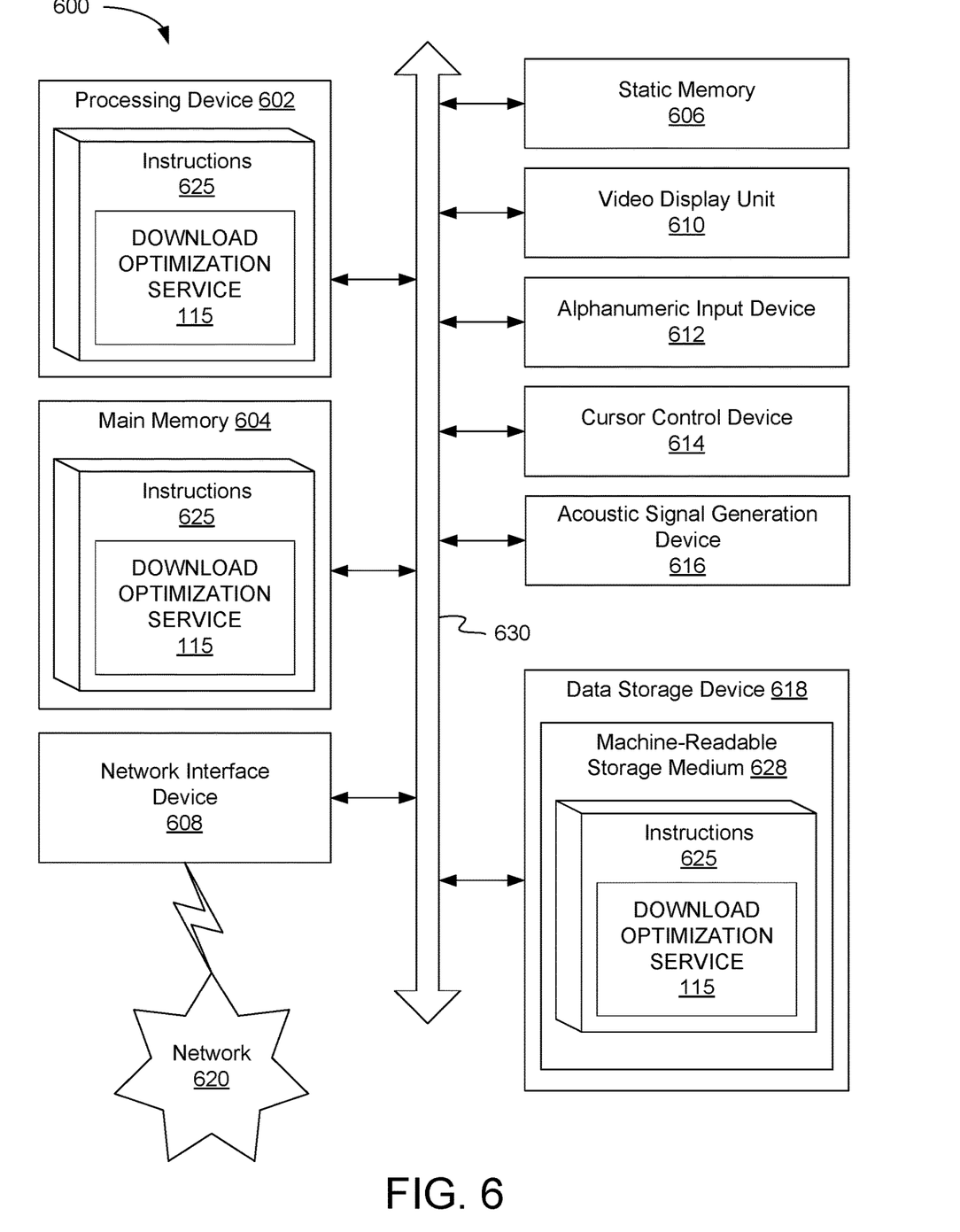
FIG. 6 is a block diagram of an example apparatus that may perform one or more of the operations described herein, in accordance with one or more aspects of the disclosure.

FIG. 6 is a block diagram of an example computing device 600 that may perform one or more of the operations described herein, in accordance with one or more aspects of the disclosure. Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general purpose processor, a PLD, etc.) 602, a main memory 604 (e.g., synchronous dynamic random access memory (DRAM), read-only memory (ROM)), a static memory 606 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also include one or more special-purpose processing devices such as an application specific integrated circuit (ASIC), a field programmable gate array (FPGA), a digital signal processor (DSP), network processor, or the like. The processing device 602 may execute the operations described herein, in accordance with one or more aspects of the present disclosure, for performing the operations and steps discussed herein.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of instructions 625 that may include instructions for a download optimization service, e.g., download optimization service 115 for carrying out the operations described herein, in accordance with one or more aspects of the present disclosure. Instructions 625 may also reside, completely or at least partially, within main memory 604 and/or within processing device 602 during execution thereof by computing device 600, main memory 604 and processing device 602 also constituting computer-readable media. The instructions 625 may further be transmitted or received over a network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "determining," "transmitting," "performing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
   determining characteristics of a plurality of nodes of a mesh network;
   selecting, by a processing device, one or more nodes of the plurality of nodes to receive a payload in view of the characteristics of the plurality of nodes of the mesh network;
   pushing, to the one or more selected nodes, a timing instruction for the one or more selected nodes to propagate the payload, wherein the timing instruction indicates whether the payload is propagated all at once; and
   pushing, by the processing device, the payload to the one or more selected nodes of the mesh network, wherein the one or more nodes propagate the payload to a plurality of remaining nodes of the mesh network according to the timing instruction.

2. The method of claim 1, further comprising:
   pushing, to the one or more selected nodes, instructions to propagate the payload to respective neighboring nodes of the one or more selected nodes.

3. The method of claim 1, wherein the characteristics comprise at least one of processing capacity, available memory, or available storage.

4. The method of claim 1, wherein the characteristics comprise:
   networking capabilities of the plurality of nodes of the mesh network.

5. The method of claim 1, wherein the characteristics comprise:
   a relative geographic location of each of the plurality of nodes of the mesh network with respect to each of the other nodes of the mesh network.

6. The method of claim 1, wherein the one or more nodes are selected further in view of characteristics of neighboring nodes of each of the plurality of nodes of the mesh network.

7. The method of claim 6, wherein the characteristics of the neighboring nodes comprise:
   networking capabilities of the neighboring nodes or a classification of the neighboring nodes.

8. A system comprising:
   a memory; and
   a processing device, operatively coupled to the memory, to:
   determine characteristics of a plurality of nodes of a mesh network;
   select one or more nodes of the plurality of nodes to receive a payload in view of the characteristics of the plurality of nodes of the mesh network;
   push, to the one or more selected nodes, a timing instruction for the one or more selected nodes to propagate the payload, wherein the timing instruction indicates whether the payload is propagated all at once; and
   push the payload to the one or more selected nodes of the mesh network, wherein the one or more nodes propagate the payload to a plurality of remaining nodes of the mesh network according to the timing instruction.

9. The system of claim 8, wherein the processing device is further to:
   push, to the one or more selected nodes, instructions to propagate the payload to respective neighboring nodes of the one or more selected nodes.

10. The system of claim 8, wherein the characteristics comprise at least one of processing capacity, available memory, or available storage.

11. The system of claim 8, wherein the characteristics comprise:
    networking capabilities of the plurality of nodes of the mesh network.

12. The system of claim 8, wherein the characteristics comprise:
    a relative geographic location of each of the plurality of nodes of the mesh network with respect to each of the other nodes of the mesh network.

13. The system of claim 8, wherein the one or more nodes are selected further in view of characteristics of neighboring nodes of each of the plurality of nodes of the mesh network.

14. The system of claim 13, wherein the characteristics of the neighboring nodes comprise:
    networking capabilities of the neighboring nodes or a classification of the neighboring nodes.

15. A non-transitory computer-readable storage medium including instructions that, when executed by a processing device, cause the processing device to:
    determine characteristics of a plurality of nodes of a mesh network;
    select, by the processing device, one or more nodes of the plurality of nodes to receive a payload in view of the characteristics of the plurality of nodes of the mesh network;
    push, to the one or more selected nodes, a timing instruction for the one or more selected nodes to propagate the payload, wherein the timing instruction indicates whether the payload is propagated all at once; and push, by the processing device, the payload to the one or more selected nodes of the mesh network, wherein the one or more nodes propagate the payload to a plurality of remaining nodes of the mesh network according to the timing instruction.

16. The non-transitory computer-readable storage medium of claim 15, wherein the processing device is further to:
push, to the one or more selected nodes, instructions to propagate the payload to respective neighboring nodes of the one or more selected nodes.

17. The non-transitory computer-readable storage medium of claim 15, wherein the characteristics comprise at least one of processing capacity, available memory, or available storage.

18. The non-transitory computer-readable storage medium of claim 15, wherein the characteristics comprise:
networking capabilities of the plurality of nodes of the mesh network.

19. The non-transitory computer-readable storage medium of claim 15, wherein the characteristics comprise:
a relative geographic location of each of the plurality of nodes of the mesh network with respect to each of the other nodes of the mesh network.

20. The non-transitory computer-readable storage medium of claim 15, wherein the one or more nodes are selected further in view of characteristics of neighboring nodes of each of the plurality of nodes of the mesh network.

* * * * *